United States Patent
Kato et al.

(10) Patent No.: US 8,717,711 B2
(45) Date of Patent: May 6, 2014

(54) LOW CLEARANCE MAGNETIC HEAD HAVING A CONTACT DETECTION SENSOR

(75) Inventors: Atsushi Kato, Odawara (JP); Hideaki Tanaka, Odawara (JP); Ichiro Oodake, Odawara (JP); Takao Yonekawa, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 289 days.

(21) Appl. No.: 13/247,931

(22) Filed: Sep. 28, 2011

(65) Prior Publication Data

US 2013/0077189 A1 Mar. 28, 2013

(51) Int. Cl.
*G11B 5/60* (2006.01)

(52) U.S. Cl.
USPC ........................................... 360/234.5

(58) Field of Classification Search
USPC ............ 360/55, 75, 234.5, 59, 234.3, 125.31, 360/125.74; 324/699; 369/126
See application file for complete search history.

(56) References Cited

U.S. PATENT DOCUMENTS

| | | | |
|---|---|---|---|
| 5,640,089 A | 6/1997 | Horikawa et al. | |
| 5,731,936 A | 3/1998 | Lee et al. | |
| 6,262,572 B1 | 7/2001 | Franco et al. | |
| 6,706,421 B1 | 3/2004 | Horng et al. | |
| 6,853,519 B2 | 2/2005 | Parker et al. | |
| 6,956,716 B2 | 10/2005 | Lille | |
| 7,164,555 B2 | 1/2007 | Kato et al. | |
| 7,589,928 B2 | 9/2009 | Roy et al. | |
| 7,623,322 B2 | 11/2009 | Umehara et al. | |
| 7,770,438 B2 | 8/2010 | Kiyono et al. | |
| 7,800,858 B1 | 9/2010 | Bajikar et al. | |
| 7,885,038 B2 | 2/2011 | Kato et al. | |
| 8,144,429 B2 * | 3/2012 | Kato ........................ | 360/234.5 |
| 2002/0067683 A1 | 6/2002 | Iverson et al. | |
| 2008/0266716 A1 | 10/2008 | Kato | |
| 2012/0262816 A1* | 10/2012 | Tanaka et al. ................ | 360/59 |
| 2013/0083430 A1* | 4/2013 | Chiu et al. ................ | 360/234.3 |

FOREIGN PATENT DOCUMENTS

JP 2008059669 A 3/2008

* cited by examiner

*Primary Examiner* — Ali Neyzari
(74) *Attorney, Agent, or Firm* — Zilka-Kotab, PC

(57) ABSTRACT

According to one embodiment, a magnetic data system includes a magnetic disk medium, a magnetic head having a writer element and/or a reader element, an exothermic resistor element for thermal fly-height control (TFC), a contact detection sensor having a resistor element and at least one contact detection electrode, and an insulating film on a medium facing side of the magnetic head to protect the contact detection sensor, the insulating film having a thickness greater than the contact detection electrode, a drive mechanism for passing the magnetic disk medium over the magnetic head, and a controller electrically coupled to the magnetic head for controlling operation of the magnetic head, wherein the controller adjusts magnetic spacing between the magnetic head and the magnetic disk medium via thermal distortion of the exothermic resistor element. The contact detection sensor may be used as a second TFC resistor element.

11 Claims, 9 Drawing Sheets

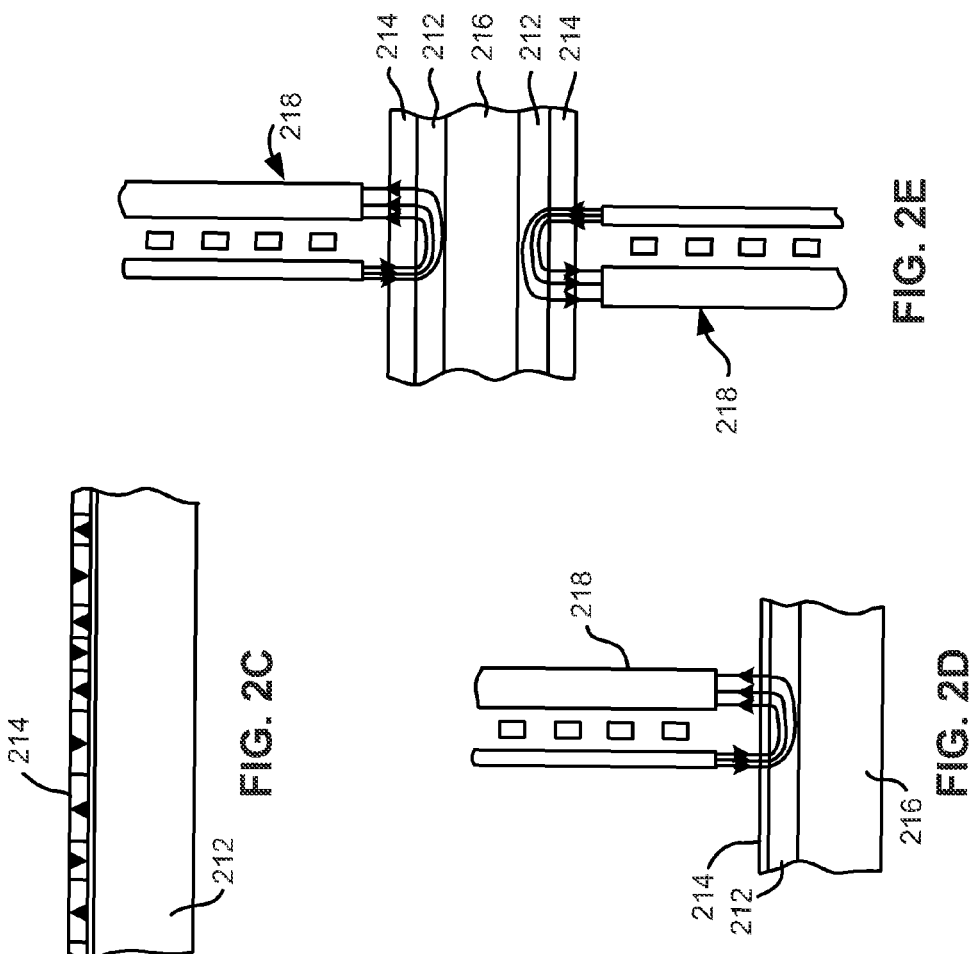
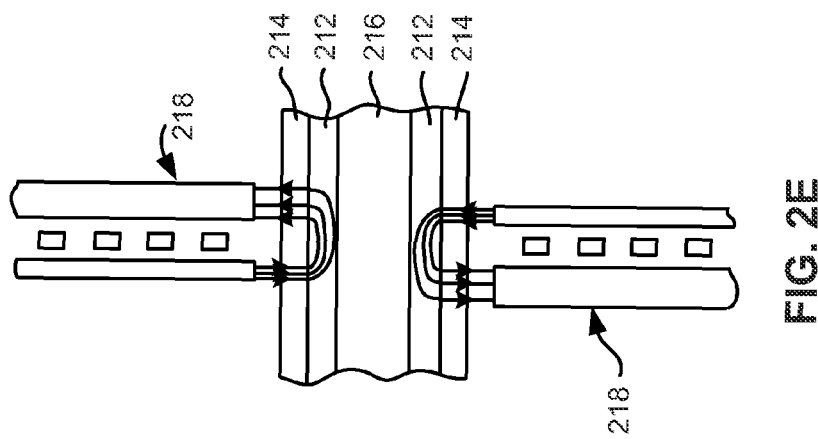
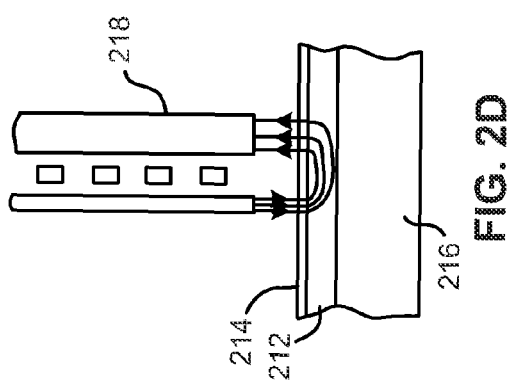
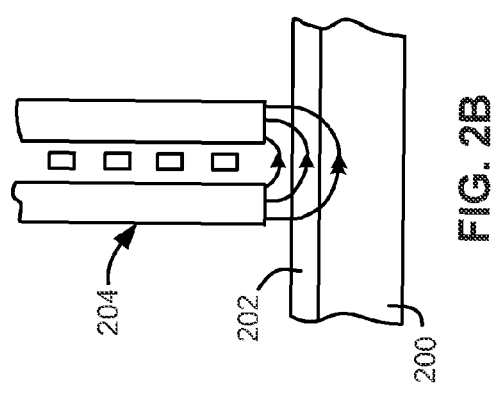
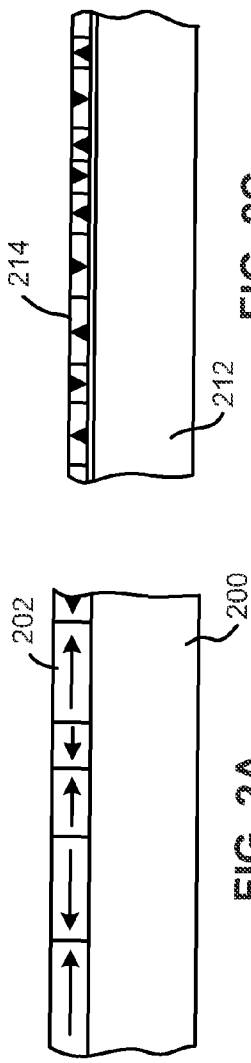

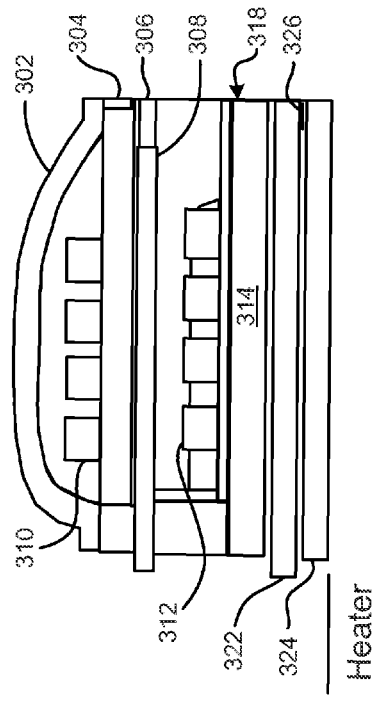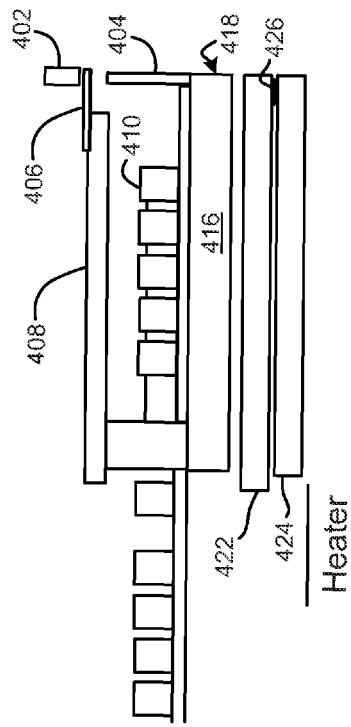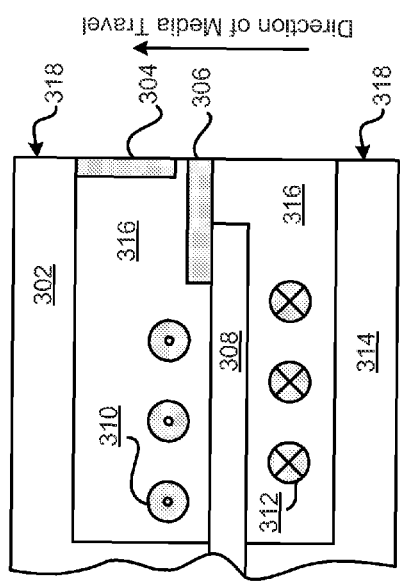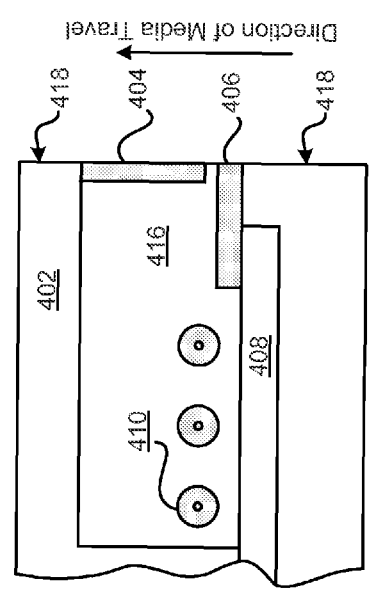

LOW CLEARANCE MAGNETIC HEAD HAVING A CONTACT DETECTION SENSOR

FIELD OF THE INVENTION

The present invention relates to hard disk drive data storage systems, and more particularly, this invention relates to a magnetic head having a contact detection sensor capable of operating at a low clearance above a magnetic disk in a hard disk drive.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components, along with a reduction in the flying height of the head over the magnetic disk.

The reduction of magnetic spacing between the magnetic disk and the magnetic head is very useful for improving the recording density of a magnetic disk device, and a reduction of the clearance between the disk and head has made a significant contribution to increased recording density. In recent years, a technique for actively controlling clearance, such as thermal fly-height control (TFC) has become more frequently used with an exothermic resistor, for example placed within the magnetic head, using the thermal expansion of the magnetic head due to heat produced by the resistor. This together with lower clearances has contributed to a reduction in the magnetic spacing.

In the most recent application of TFC technology, TFC control is used to create contact between the magnetic disk and the magnetic head, enabling a method to be employed whereby minute clearances of less than a few nanometers can be stably maintained by slightly reducing the amount of electric power supplied to the TFC heater in this state.

From this advancement, high-sensitivity detection of contact between the magnetic disk and the magnetic head is absolutely vital to ensure stability of low clearance and to ensure reliability. With conventional magnetic disk devices, methods of detecting contact generally involve assessing vibration of the magnetic head due to the contact from the output fluctuations, monitoring fluctuations in the positioning signal due to frictional force of contact, or detecting additional fluctuations in the voice coil motor and the spindle motor. However, with these methods, contact is not directly detected, and since vibration may indicate secondary fluctuations, it is difficult to detect contact with high precision. Therefore, the precision of contact detection has become a significant limiting factor in achieving low clearances. As a result, there is a demand for a contact sensor with high sensitivity able to detect contact more directly.

SUMMARY

In one embodiment, a magnetic data system includes a magnetic disk medium, at least one magnetic head, each magnetic head having at least one of: a writer element and a reader element, an exothermic resistor element, a contact detection sensor having a resistor element and at least one contact detection electrode, and an insulating film on a medium facing side of the magnetic head configured to protect the contact detection sensor, the insulating film having a thickness greater than a thickness of the at least one contact detection electrode, a drive mechanism for passing the magnetic disk medium over the at least one magnetic head, and a controller electrically coupled to the at least one magnetic head for controlling operation of the at least one magnetic head, wherein the controller adjusts magnetic spacing between the at least one magnetic head and the magnetic disk medium via thermal distortion of the exothermic resistor element.

In another embodiment, a contact detection sensor includes a resistor element, at least one contact detection electrode, and an insulating film adjacent a medium facing end of the at least one contact detection electrode, the insulating film being configured to protect the resistor element, wherein the insulating film has a thickness greater than a thickness of the at least one contact detection electrode.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation if a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof which include a contact detection sensor that may be used as a thermal fly-height control (TFC) element.

In one general embodiment, a magnetic data system includes a magnetic disk medium, at least one magnetic head, each magnetic head having at least one of: a writer element and a reader element, an exothermic resistor element, a contact detection sensor having a resistor element and at least one contact detection electrode, and an insulating film on a medium facing side of the magnetic head configured to protect the contact detection sensor, the insulating film having a thickness greater than a thickness of the at least one contact detection electrode, a drive mechanism for passing the magnetic disk medium over the at least one magnetic head, and a controller electrically coupled to the at least one magnetic head for controlling operation of the at least one magnetic head, wherein the controller adjusts magnetic spacing between the at least one magnetic head and the magnetic disk medium via thermal distortion of the exothermic resistor element.

In another general embodiment, a contact detection sensor includes a resistor element, at least one contact detection electrode, and an insulating film adjacent a medium facing end of the at least one contact detection electrode, the insulating film being configured to protect the resistor element, wherein the insulating film has a thickness greater than a thickness of the at least one contact detection electrode.

Figure 1:
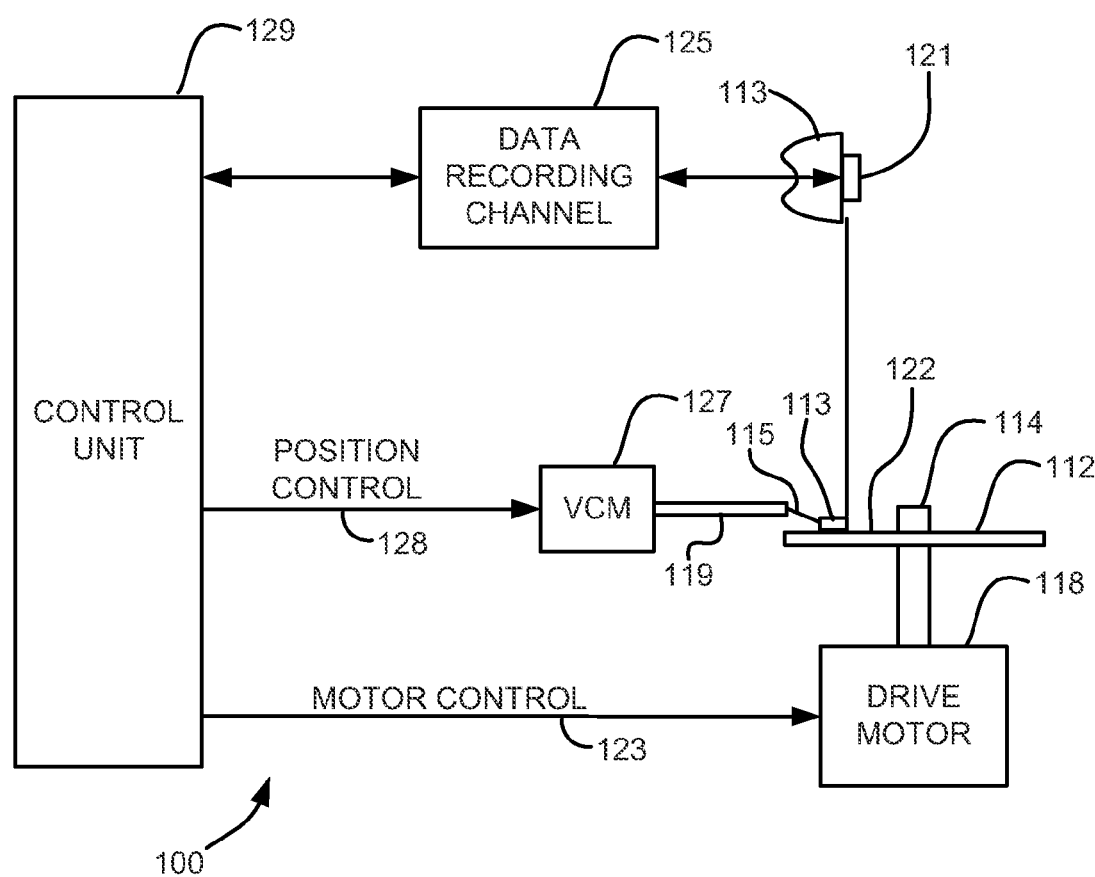
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The central unit 129 generates control signals to control various system operations such as drive motor control signals on line 123 and head position and seek control signals on line 128. The control signals on line 128 provide the desired current profiles to optimally move and position slider 113 to the desired data track on disk 112. Read acrd write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator dray support a number of sliders.

An interface may also be provided for communication between the disk drive and a host integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which tends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may pr vide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 38 and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

An example of a magnetic head with a built-in contact sensor is described in U.S. Pat. No. 6,262,572, which shows a glide head that is used for testing disks that is provided with a "Thermal Asperity" detection function, which has a resistor whose resistance changes with temperature, the minute generation of heat due to contact with projections on the magnetic disk being assessed as changes in resistance. Moreover, U.S. Pat. No. 7,589,928 discloses a method of detecting drops in temperature in the magnetic head due to the radiation of heat in states of extreme proximity to the magnetic disk as changes in resistance, with an exothermic heater positioned on the magnetic head and using a sensor with an identical structure. Both of these techniques employ built-in sensors whose resistance changes with temperature, and are characterized in that the state of contact is detected from changes in resistance due to changes in sensor temperature accompanied by a closer proximity to contact with the magnetic disk. These methods are methods of detecting contact more directly, and enable contact to be detected with greater precision.

However, this conventional technology, being mounted on the magnetic head and used as a method of contact detection within the magnetic disk device, provides insufficient detail regarding conditions regarding the structure and material of the contact sensor.

According to one embodiment, a magnetic head comprises a contact sensor that is not destroyed upon contact, and is configured to consistently position the contact sensor at a lowest point (closest to the disk surface) which does not rely on changes in a state of the head or temperature changes in the environment, while maintaining a ugh level of detection accuracy.

Figure 5:
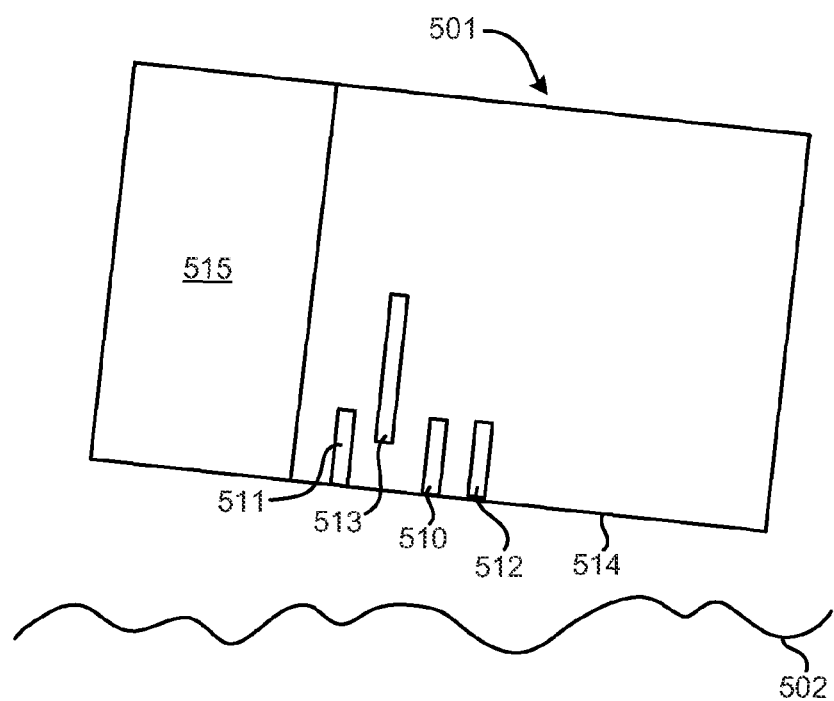
FIG. 5 shows a side view of a magnetic head without protrusion, according to one embodiment.
Figure 6:
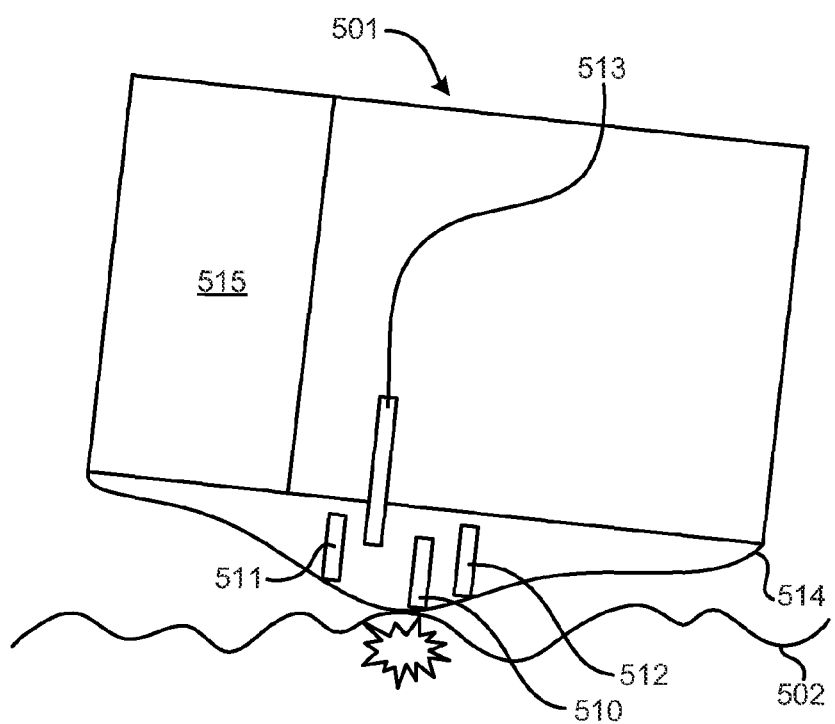
FIG. 6 shows a side view of a magnetic head with protrusion, according to one embodiment.

The operation of a magnetic head mounted with a contact sensor is shown schematically in FIGS. 5-6. Magnetic head 501 is mounted with reader element 511, writer element 512, exothermic resistor 513, also referred to as a thermal actuator which may be used for thermal fly-height control (TFC), and a contact sensor 510. According to some embodiments, the contact sensor may comprise an exothermic resistor. FIG. 5 shows a situation where the exothermic resistor 513 is not operating and the head floats on the magnetic disk medium 502. FIG. 6 shows a situation where the exothermic resistor 513 acts to cause thermal distortion, and the magnetic head 501 and magnetic disk medium 502 have come into contact. The actual reading and writing operation is carried out with power applied to the exothermic resistor 513 reduced by a set amount from the contact situation shown in FIG. 6, in some embodiments, with the magnetic head 501 and the magnetic disk 502 maintained in a state of minimal clearance (a situation which is not shown in FIGS. 5-6).

In one embodiment, the contact sensor 510 may be positioned close to the point where the magnetic head 501 and the magnetic disk medium 502 are in contact, as shown in HG. 6. As exothermic resistor 513 (also referred to as a TFC heater) is designed so that the reader element 511 and the writing element 512 are both in close proximity to the magnetic disk medium 502 through its action, and contact sensor 510 may be positioned between the reader element 511 id the writer element 512 in the direction of media movement across the magnetic head to ensure contact has or has not occurred. It should be noted that to simplify the diagram in FIGS. 5-6, a protective film is not shown on the medium facing side 514 of the magnetic head 501 facing the magnetic disk medium 502, but it will be clear to one of skill in the art that it is beneficial to have a protective film on the medium facing side 514.

Referring again to FIGS. 5-6, the magnetic head wafer after manufacture may be cut in a machine process, forming a medium facing side 514 which floats on the magnetic disk 502, to obtain the magnetic head 501 as shown in FIG. 5. A protective film comprising a carbon film or some other suitable material as would be understood by one of skill in the art may be formed on the medium facing side 514. The protective film may have a thickness of about 2 nm in some approaches. In other approaches, the thickness may be more or less.

Moreover, the contact sensor 510 may be used as a second heater in addition to the TFC heater 513. To ensure functionality when used as a second heater for the TFC heater 513, and also to ensure proper function as a contact sensor, electrical contact with the heater is provided so that current is supplied to the contact sensor 510 when the elements are made to protrude due to activation of the TFC heater 513.

The current supplied to the contact sensor 510 has a dual function of being both current for use of the contact sensor 510 and current supply for the contact sensor 510 as a second heater element. Moreover, by giving the contact sensor 510 the function of a second TFC heater, it is possible to use the first TFC heater 513 for rough adjustment of clearance, with the contact sensor 510 being used as the second heater enabling minute adjustment of the clearance between the magnetic head 501 and the magnetic disk medium 502.

Normally, the contact sensor 510 is used at levels where it effectively does not protrude. According to embodiments described herein, it is possible to ensure that current flows at a level which deliberately causes the contact sensor 510 to protrude. In this way, the cur ent changes during reading and writing, enabling the respective degrees of protrusion to be controlled or so that protrusion may be made to occur locally in the vicinity of contact only. As protrusion may be controlled and used in this way, it is likely to be effective in error recovery as well.

Figure 7:
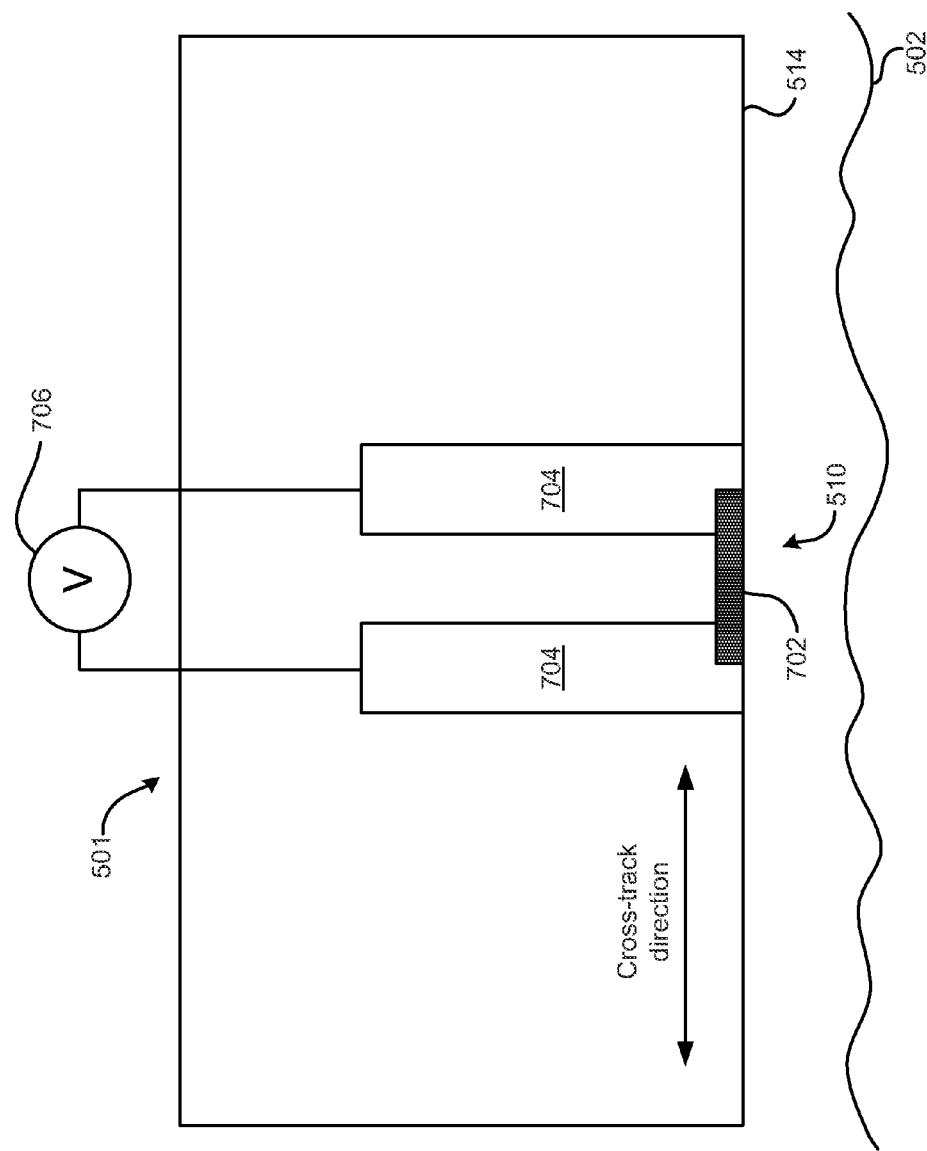
FIG. 7 shows a simplified diagram of a contact sensor, according to one embodiment.

A schematic structure of the contact sensor 510 is shown in FIG. 7, according to one embodiment. The contact sensor 510 comprises a sensor film 702 and at least one electrode 704 which bring power to the sensor film 702, and is positioned either internally or externally to the magnetic head 501, according to various embodiments, with contact detection performed via circuitry 706. The sensor film 702 may be an electric resistor in one approach, and it may detect temperature changes during contact or proximity between the sensor film 702 and the magnetic disk medium 502. The sensor film 702 may comprise a material whose resistance varies with temperature, according to one embodiment. Given the principles of contact detection, material for use in sensor film 702 may be material having a specific resistance which varies greatly with changes in temperature. It may, for example, be an NiFe alloy, in one embodiment. As for the material of the at least one electrode 704, corrosion resistance is also a factor since the at least one electrode 704 also comes into contact with the medium facing side 514, or may have a structure in which the at least one electrode 704 is exposed via a thin protective film. For example, main components of the at least one electrode 704 may be comprise one or more of: Ru, Rh, Ta, Cu, and Au, either as a simple substance or as an alloy.

According to more preferred embodiments, a NiFe alloy may be used for the sensor film 702 in order to ensure anti-migration, as described above. Moreover, as a method of improving precision of detection with the sensor film 702, current losses and thermal losses may be reduced by lowering the resistance of the at least one electrode 704, in order to have as much current as possible flowing in the sensor film 702. For this reason, it is also effective to reduce the resistance by having any of the sensor film 702 and/or the at least one electrode 704 comprise Ru, Rh, Ta, Cu, and/or Au, as a simple substance or as an alloy, and also having the at least one electrode 704 having a layered structure of two or more layers with at least one layer exposed to the medium facing side 514.

Moreover, in one approach a thickness of the insulating film may be greater than a thickness of the at least one electrode 704 of the contact sensor 510 for ensuring insulation between the contact sensor 510 and the shield/magnetic pole metal film to prevent electrical leakage between the contact sensor 510 and the shield/magnetic pole metal film.

Thus as described above, it is ensured that the contact sensor 510 is not damaged or destroyed during contact between the contact sensor 510 and the magnetic disk medium 502. Moreover, due to this careful attention in prescribing the thickness of the insulating film, the material of the sensor film 702 and the material and layer structure of the at least one electrode 704, damage and/or destruction of the contact sensor 510 is avoided and electrical leakage between the contact sensor 510 and the shield/magnetic pole metal film is prevented or minimized to be insignificant.

Figure 8:
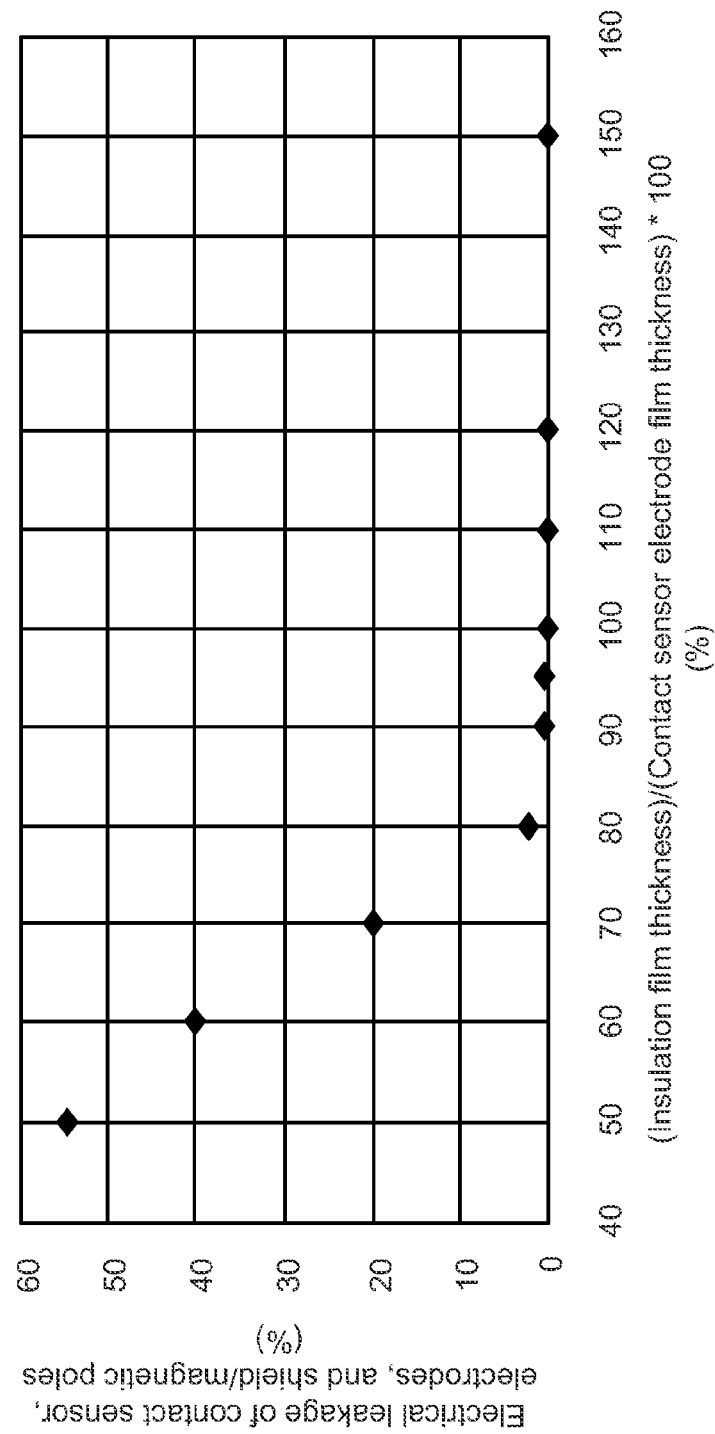
FIG. 8 shows a plot of electrical leakage versus insulating film thickness, according to one embodiment.

Contact sensor 510 may come into contact with the magnetic disk medium 502, and cannot function as a contact sensor at this time if the sensor film 702 is destroyed or damaged. The prevention of damage to the sensor film 702 is an essential condition for using a contact sensor for more than a brief period of time, and as shown in FIG. 8, the thickness of the insulating film protecting the sensor film 702 when greater than a thickness of the at least one electrode 704 provides much better protection against electrical leakage than when it is thinner than the thickness of the at least one electrode 704.

Without wishing to be bound by any particular theory, this may be because of a phenomena where, as more alumina attaches to the large stepped section, a difference in film quality occurs relative to the flat section, resulting in a greater likelihood of leakage; in other words, a poor film quality. Moreover, when the insulating film of alumina or the like attaches to the stepped portion, the film thickness is at least less than the film thickness of the flat section. The greater the step, the worse the attachment of the alumina, which results in the film thickness being thinner relative to the same film thickness in the flat section. The thicker the insulating film, the lower the proportion of leakage. Again, not wishing to be bound to any particular theory, this is surmised to be because pinholes in the insulating film and like defects are reduced, and this reduction in defects also reduces the probability of leakage through the insulating film.

Referring again to FIGS. 5-7, in another embodiment, the contact sensor 510 may be used as a second heater in addition to the TFC heater 513. Given anti-migration considerations (i.e., the prevention of movement of material between surfaces), the sensor film 702 may be formed of a NiFe alloy. As a method of improving the detection accuracy of the sensor film 702, and to ensure that a greatest amount of current flows in the sensor film 702 as possible, a resistance of the at least one electrode 704 may be reduced, thereby reducing current and thermal losses. To accomplish this reduction, Ru, Rh, and/or Ta may be used as components in an alloy or as simple substances, and with the at least one electrode 704 arranged as a laminated structure comprising two or more layers, resistance may be effectively reduced by exposing at least one layer on the medium facing side 514. Moreover, since the prevention of electrical leakage between the contact sensor 510 and a shield and/or a magnetic pole metal film improves performance of the magnetic head 501, this leakage may be prevented or vastly minimized to be insignificant by ensuring that the thickness of the insulating film adjacent a medium facing side of the at least one electrode 704 for insulation between the contact sensor 510 and the shield/magnetic pole metal film is greater than a film thickness of the at least one electrode 704 of the contact sensor 510.

In one embodiment, reader element 511 comprising a TMR element and a thermal actuator 513 comprising an exothermic resistor may be sequentially laminated onto a wafer substrate 515 for the magnetic head 501, forming the sensor film 702 comprising a NiFe alloy and at least one electrode 704 comprising Ru as a contact sensor 510. The film thickness may be adjusted so that the width of the sensing portion of the sensor film 702 (the gap between electrodes 704) is about 1 μm, a height from the medium facing side 514 of about 0.2 μm, and a resistance of approximately 100Ω. A film thickness of about 30 nm may be used in some approaches. Writer element 512 is further formed on the contact sensor 510.

In one embodiment, a contact detection sensor 510 comprises a resistor element 702, at least one contact detection electrode 704, and an insulating film (925, FIGS. 9A-9C) adjacent a medium facing side 514 of the at least one contact detection electrode 704, the insulating film being configured to protect the resistor element 702, wherein the insulating film has a thickness greater than a thickness of the at least one contact detection electrode 704.

In one approach, the resistor element 702 comprises an alloy of NiFe configured to be used as a second thermal fly-height control (TFC) heating element that resists migration. Moreover, a thickness of the insulating film along a line between the contact detection sensor 510 and a nearest shield and/or magnetic pole may be greater than a thickness of the at least one contact detection electrode 704 such that electrical leakage between the contact detection sensor 510 and the shield and/or magnetic pole is insignificant. In this or other approaches, the insulating film may be directly adjacent the contact detection sensor. In a further approach, the thickness of the insulating film may be in a range between one and ten times the thickness of the at least one contact detection electrode 704 such that thermal protrusion increases.

In another approach, the at least one contact detection electrode 704 may have a laminated structure comprising two or more layers configured to reduce local current and thermal loss via a lowered resistance of the at least one contact detection electrode 704. Moreover, at least one layer on a medium facing side 514 of the laminated structure of the at least one contact detection electrode 704 may be exposed.

In other embodiment, the at least one contact detection electrode 704 pray have a laminated structure comprising two or more layers and may comprise at least one of: Ru, Rh, Ta, Cu, and Au. Moreover, at least one layer of the laminated structure of the at least one contact detection electrode 704 may be exposed on a medium facing side 514 of the magnetic head 501.

According to another approach, the contact detection sensor 510 may be configured to be used as a second TFC heating element, and a thickness of the insulating film between the contact detection sensor 510 and a nearest shield and/or magnetic pole may be greater than a thickness of the at least one contact detection electrode 704.

Figure 9A:
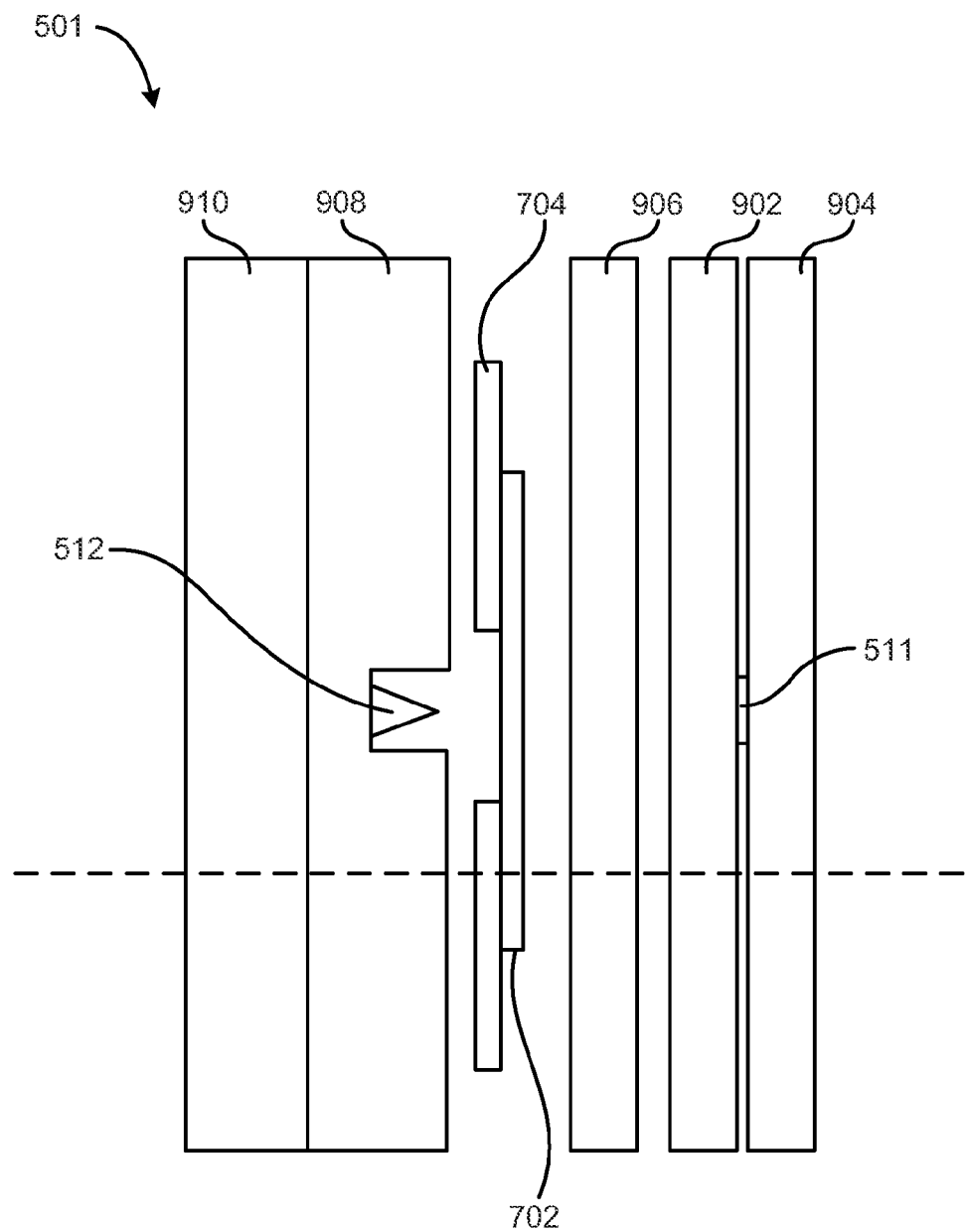
FIG. 9A shows a magnetic head from a medium facing side, according to one embodiment.
Figure 9B:
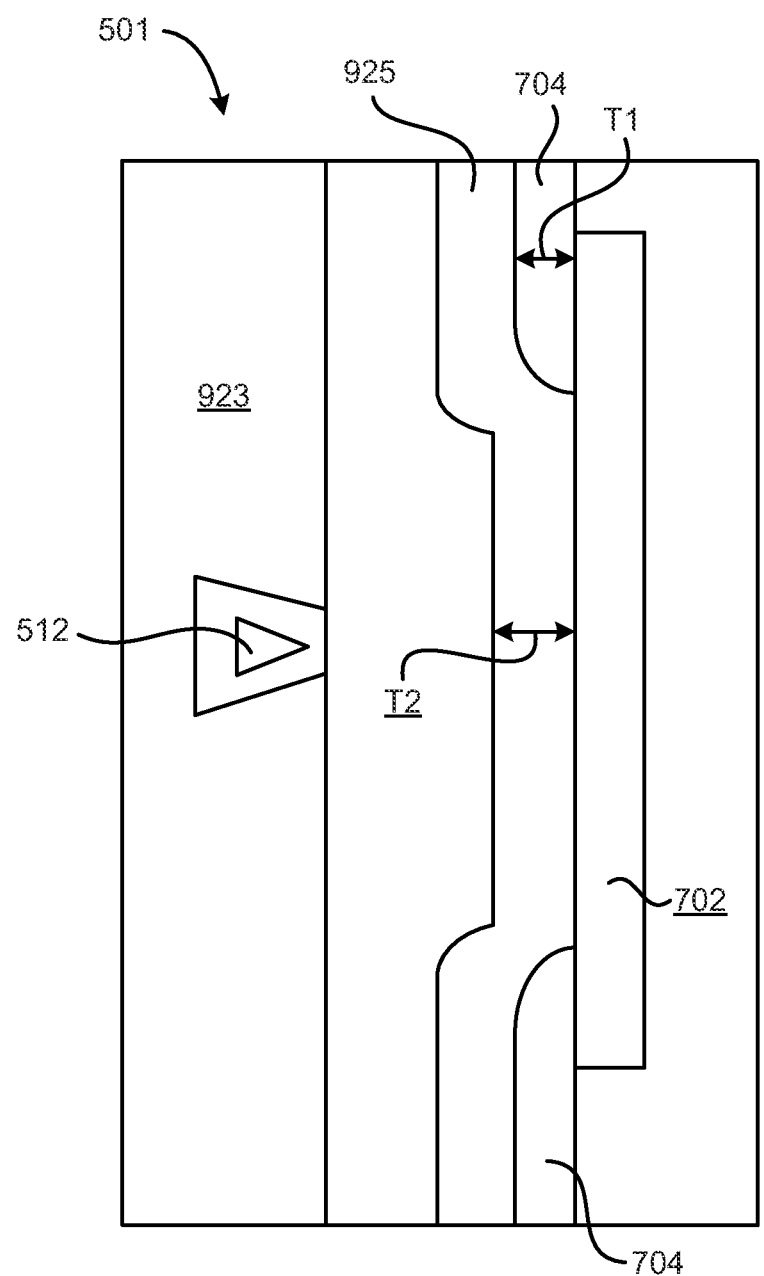
FIG. 9B shows a detailed view of the magnetic head, according to one embodiment.
Figure 9C:
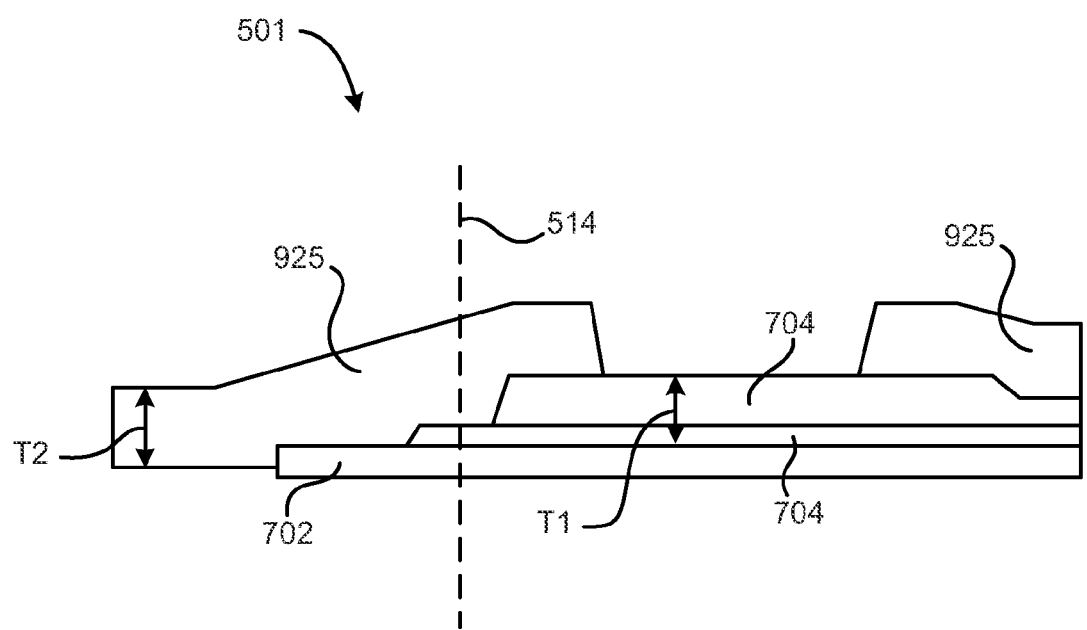
FIG. 9C shows a detailed side view of the magnetic head, according to one embodiment.

FIGS. 9A-9C show a schematic structure for a magnetic head 501 as seen from the medium facing side, according to one embodiment. The magnetic head 501 comprises an upper shield 902 (for reading operations primarily), a lower shield 904 (for reading operations primarily), a reader element 511, an upper return pole 910, a lower return pole 906, a write shield 908, and a main write pole (writer element) 512. In this example, a sensor film 702 and at least one electrode 704 are positioned below the main write pole 512, but they may be positioned on the wafer in other approaches.

FIG. 9B shows a more detailed view of components of the magnetic head 501. Specifically, the insulating film 925 is shown, along with the thickness of the insulating film 925 along a line where the insulating fit 925 protects the sensor film 702. In this or other approaches, the insulating film may be directly adjacent the contact detection sensor. Along this line, the thickness T2 of the insulating film 925 may be greater than the film thickness T1 of the at least one electrode 704, so that the contact sensor is not damaged when placed in contact with the magnetic disk medium.

The insulating film 925, according to one embodiment, may comprise alumina. Of course, any other insulating material as would be understood by one of skill in the art may be used.

Referring again to FIG. 9A, the insulating film 925 may also prevent or minimize electrical leakage between the contact sensor and any shields and/or magnetic material, such as the main pole 512, the write shield 908, the lower return pole 906, the upper shield 902, the lower shield 904, etc. Now referring to FIG. 9B, this may be accomplished by ensuring that the thickness T2 of the insulating film 925 is greater than a thickness T1 of the at least one electrode 704 of the contact sensor for providing adequate insulation between the sensor film 702 and any shield/magnetic pole metal film and prevent electrical leakage between the contact sensor and the shield/magnetic pole metal film.

Now referring to FIG. 9C, a side view of the magnetic head 501 is shown according to one embodiment. In this embodiment, two electrodes 704 are used, but any number may be used according to various embodiments. The medium facing side 514 is shown prior to being formed.

According to more embodiments, the magnetic head 501 may be utilized in a system. For example, referring to FIGS. 5-9C, a magnetic data system may comprise a magnetic disk medium 502, at least one magnetic head 501, each magnetic head 501 comprising at least one of: a writer element 512 and a reader element 511, an exothermic resistor element 13, a contact detection sensor comprising a resistor element 702 and at least one contact detection electrode 704, and an insulating film 925 on a medium facing side 514 of the magnetic head 501 configured to protect the contact detection sensor, the insulating film 925 having a thickness greater than a thickness of the at least one contact detection electrode 704.

Also, as shown in FIG. 1, the magnetic data system 100 may also comprise a drive mechanism 118 for passing the magnetic disk medium 112 over the at least one magnetic head 121 and a controller 129 electrically coupled to the at least one magnetic head 121 for controlling operation of the at least one magnetic head 121, wherein the controller 129 adjusts magnetic spacing between the at least one magnetic head 121 and the magnetic disk medium 112 via thermal distortion of the exothermic resistor element.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic data system, comprising:
   a magnetic disk medium;
   at least one magnetic head, each magnetic head comprising:
      at least one of: a writer element and a reader element;
      an exothermic resistor element;
      a contact detection sensor comprising:
         a resistor element; and
         at least one contact detection electrode; and
      an insulating film on a medium facing side of the magnetic head configured to protect the contact detection sensor, the insulating film having a thickness greater than a thickness of the at least one contact detection electrode;
   a drive mechanism for passing the magnetic disk medium over the at least one magnetic head; and
   a controller electrically coupled to the at least one magnetic head for controlling operation of the at least one magnetic head, and
   wherein the controller adjusts magnetic spacing between the at least one magnetic head and the magnetic disk medium via thermal distortion of the exothermic resistor element.

2. The magnetic data system as recited in claim 1, wherein the contact detection sensor comprises an alloy of NiFe configured to be used as a second thermal fly-height control (TFC) heating element that resists migration.

3. The magnetic data system as recited in claim 2, wherein a thickness of the insulating film along a line between the contact detection sensor and a nearest shield and/or magnetic pole is greater than a thickness of the at least one contact detection electrode such that electrical leakage between the contact detection sensor and the shield and/or magnetic pole is insignificant, and wherein the insulating film is directly adjacent the contact detection sensor.

4. The magnetic data system as recited in claim 3, wherein the thickness of the insulating film is in a range between one and ten times the thickness of the at least one contact detection electrode such that thermal protrusion increases.

5. The magnetic data system as recited in claim 1, wherein the at least one contact detection electrode has a laminated structure comprising two or more layers configured to reduce local current and thermal loss via a lowered resistance of the at least one contact detection electrode.

6. The magnetic data system as recited in claim 5, wherein at least one layer of the laminated structure of the at least one contact detection electrode is exposed on a medium facing side of the magnetic head.

7. The magnetic data system as recited in claim 1, wherein the at least one contact detection electrode has a laminated structure comprising two or more layers and comprises at least one of: Ru, Rh, Ta, Cu, and Au.

8. The magnetic data system as recited in claim 7, wherein at least one layer of the laminated structure of the at least one contact detection electrode is exposed on a medium facing side of the magnetic head.

9. The magnetic data system as recited in claim 1, wherein the contact detection sensor is configured to be used as a second thermal fly-height control (TFC) heating element, and wherein a thickness of the insulating film between the contact detection sensor and a nearest shield and/or magnetic pole is greater than a thickness of the at least one contact detection electrode.

10. A magnetic data storage system, comprising:
    at least one magnetic head comprising the contact detection sensor, the contact detection sensor comprising:
       a resistor element,
       at least one contact detection electrode, and
       an insulating film adjacent a medium facing end of the at least one contact detection electrode, the insulating film being configured to protect the resistor element, wherein the insulating film has a thickness greater than a thickness of the at least one contact detection electrode;
    a magnetic disk medium;
    a drive mechanism for passing the magnetic disk medium over the at least one magnetic head; and
    a controller electrically coupled to the at least one magnetic head for controlling operation of the at least one magnetic head.

11. The magnetic data storage system, as recited in claim 10, wherein the controller adjusts magnetic spacing between the at least one magnetic head and the magnetic disk medium via thermal distortion of the exothermic resistor element.

* * * * *

UNITED STATES PATENT AND TRADEMARK OFFICE
CERTIFICATE OF CORRECTION

PATENT NO. : 8,717,711 B2  
APPLICATION NO. : 13/247931  
DATED : May 6, 2014  
INVENTOR(S) : Kato et al.

It is certified that error appears in the above-identified patent and that said Letters Patent is hereby corrected as shown below:

In the specification:

col. 2, line 60 replace "if" with --of--;
col. 4, line 35 replace "central" with --control--;
col. 4, line 40 replace "acrd" with --and--;
col. 4, line 47 replace "dray" with --may--;
col. 4, line 49 replace "integral" with --(integral--;
col. 4, line 66 replace "tends" with --extends--;
col. 6, line 17 replace "pr vide" with --provide--;
col. 6, line 33 replace "38" with --3B--;
col. 7, line 2 replace "ugh" with --high--;
col. 7, line 24 replace "HG." with --FIG.--;
col. 7, line 29 replace "id" with --and--;
col. 7, line 66 replace "cur ent" with --current--;
col. 10, line 16 replace "other" with --another--;
col. 10, line 17 replace "pray" with --may--;
col. 10, line 42 replace "fit" with --film--;
col. 11, line 8 replace "13," with --513,--.

Signed and Sealed this  
Fifth Day of August, 2014

Michelle K. Lee  
*Deputy Director of the United States Patent and Trademark Office*